United States Patent [19]

Burger

[11] Patent Number: 5,765,654
[45] Date of Patent: Jun. 16, 1998

[54] DEVICE FOR COLLECTING DRILLED MATERIAL AND DUST

[75] Inventor: Helmut Burger, Moorenweis, Germany

[73] Assignee: Hilti Aktiengesellschaft, Schaan, Liechtenstein

[21] Appl. No.: 779,635

[22] Filed: Jan. 7, 1997

[30] Foreign Application Priority Data

Jan. 12, 1996 [DE] Germany .................. 196 00 829.8

[51] Int. Cl.⁶ ........................................ E21C 7/12
[52] U.S. Cl. ................ 175/211; 408/72 R; 408/110; 144/252.2
[58] Field of Search .................... 175/308, 211, 175/209; 408/72 R, 110; 144/252.1, 252.2

[56] References Cited

U.S. PATENT DOCUMENTS

| | | |
|---|---|---|
| 2,879,035 | 3/1959 | Tilden . |
| 3,033,298 | 5/1962 | Johnson . |
| 3,339,435 | 9/1967 | Heitz . |
| 3,351,143 | 11/1967 | Seibold et al. . |
| 3,583,821 | 6/1971 | Shaub . |
| 3,788,423 | 1/1974 | Nittinger et al. . |
| 3,936,213 | 2/1976 | Kappel . |
| 4,064,952 | 12/1977 | Lechner . |
| 4,117,750 | 10/1978 | Kopelev et al. . |
| 4,298,073 | 11/1981 | Yates . |
| 4,407,513 | 10/1983 | Takenaka et al. . |
| 4,711,609 | 12/1987 | Seefluth . |

FOREIGN PATENT DOCUMENTS

| | | |
|---|---|---|
| 0218744 | 4/1987 | European Pat. Off. . |
| 261374 | 3/1988 | European Pat. Off. . |
| 432832 | 2/1926 | Germany . |
| 1427714 | 1/1969 | Germany . |

*Primary Examiner*—Roger J. Schoeppel
*Attorney, Agent, or Firm*—Anderson, Kill & Olick, P.C.

[57] ABSTRACT

A device, for collecting drilled material and dust produced by a drilling tool, has a flange part (1) with a central axis to be secured to a housing of the drilling tool, and an axially extending container (2) for receiving the drilled material and dust and connected to and extending axially outwardly from the flange part (1) and being compressible in its axial direction towards the flange part. A ring-shaped sealing element (3) is arranged to contact a rotating part of the drilling tool. A radially outwardly extending annular rib on the sealing element is rotatably supported in an annular recess (26) in the flange part (1) and the recess is open towards the axis of the flange part so that no harmful wear can arise in spite of adequate sealing between the sealing element and the rotating part of the drilling tool.

10 Claims, 2 Drawing Sheets

DEVICE FOR COLLECTING DRILLED MATERIAL AND DUST

BACKGROUND OF THE INVENTION

The present invention is directed to a device for collecting drilled material and dust produced by drilling tools and having a flange part arranged to be connected to a housing part of the drilling tool, a container connected to the flange part and being compressible parallel to a central axis of the flange part, and a ring-shaped sealing element disposed in contact with a rotating part of the drilling tool.

A device for collecting drilled material and dust from a drilling tool is disclosed in DE-OS 1 427 714. The device includes a flange part, a bellows connected to the flange part, and a disk-shaped sealing element in the flange part and the sealing element has a central passageway. A rotating part of the drilling tool extends through the passageway and the rotating part can be a drill held in a drill chuck. When the drilling tool is operated, the drill rotates relative to the sealing element. The friction developed during such rotation causes heating and high wear of the sealing element.

SUMMARY OF THE INVENTION

Therefore, the primary object of the present invention is to provide a device for collecting drilled material and dust from a drilling tool having a sealing element cooperating in a wear resistant and leakproof manner with a rotating part of a drilling tool. By the rotating parts of the drilling tool are meant drills and drill chucks.

In accordance with the present invention, such object is attained by a sealing element rotatably supported in a circumferentially extending recess in the flange part with the recess opened towards a central axis of the flange part.

By rotatably supporting the sealing element in a circumferentially or annularly arranged recess of the flange part, with the recess opened towards the central axis of the flange part, it is possible to provide a connection of the sealing element with a rotating part of the drilling tool without damaging the sealing element by wear.

The sealing element is supported between side wall surfaces of the recess with the interposition of a felt ring on each of the opposite surfaces of the sealing element extending into the recess. The felt rings assure support of the sealing element which rotates relative to the flange part in the recess. One felt ring is located on each of the opposite surfaces of the sealing element and bears against the side wall surfaces of the recess.

A first side wall surface of the recess cooperating with a first felt ring is preferably provided with projections extending into the felt ring for preventing the felt ring from movement relative to the first side wall surface of the flange part. The projections extending inwardly from the first side wall surface project into the felt ring and hold it in position. The height or length of the projections is less than the corresponding thickness of the first felt ring. The projections are pin-shaped and extend basically perpendicularly from the first side wall surface.

To prevent drilled material or dust from reaching between the felt ring fixed on the first side wall surface and the sealing element, on the opposite side of the sealing element a thrust ring bears against a second felt ring and, in turn, an undulating or wave-shaped washer is located between the thrust ring and a second side wall surface of the recess. The wave-shaped washer abutting against the second side wall surface presses the second felt ring with the interposition of the thrust washer axially against a surface of the sealing element facing opposite the surface contacted by the first felt ring. Accordingly, a surface of the sealing element facing in the drilling direction is pressed against the first felt ring.

To prevent the second felt ring from turning relative to the thrust washer, the side of the thrust washer facing the second felt ring is preferably provided with projections or projecting members. The projecting members extending outwardly from the thrust washer extend into the second felt ring and hold it in a fixed manner. The height or length of the projecting members is less than the thickness of the second felt ring. The projecting members are arranged as pin-shaped members projecting basically perpendicularly from the thrust washer.

For ease in assembling the sealing element, the felt rings, the thrust washer and the undulating washer in the recess formed in the flange part bear against the second side wall surface of the recess which is formed as an internal retaining ring or circlip.

The sealing element can be placed in engagement with a rotating part of the drilling tool. For instance, the sealing element can engage the drill or the drill chuck in a sealing or leak proof manner. To achieve an adequate sealing action between the sealing element and the rotating part of the drilling tool, the ring shaped sealing element has an annular sealing surface extending generally parallel relative to the central axis of the flange part.

The ring shaped sealing surface of the sealing element cooperates with an external surface of a rotating drill chuck. Preferably, the sealing surface is provided with a profiled surface so that there is no relative rotation between the sealing surface and the drill chuck. Due to the profiled surface, a positively locked connection of the sealing element with the correspondingly profiled exterior surface of the drill chuck can be established.

The flange part serves in a preferred manner for supporting and guiding a depth stop. Since the compressible container connected to the flange part covers a drill, the tool operator, during operation of the tool, cannot determine the depth the drill has penetrated into the receiving material being drilled. By using a depth stop this problem can be eliminated. The further arrangement of a receiving region for the depth stop on the flange part can be realized economically and, in addition, provides the advantage that the depth stop on the flange part can be removed from the drilling tool along with the device for collecting drilled material and dust when the drilling tool is no longer in use.

For economical manufacture and for easy adjustability of the desired drilling depth, the depth stop is formed of a bar-shaped element connected to the container and displaceable relative to the flange part and arranged parallel to the central axis of the flange part and can be provided with a stop element that can be fixed axially to the transmittal element.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
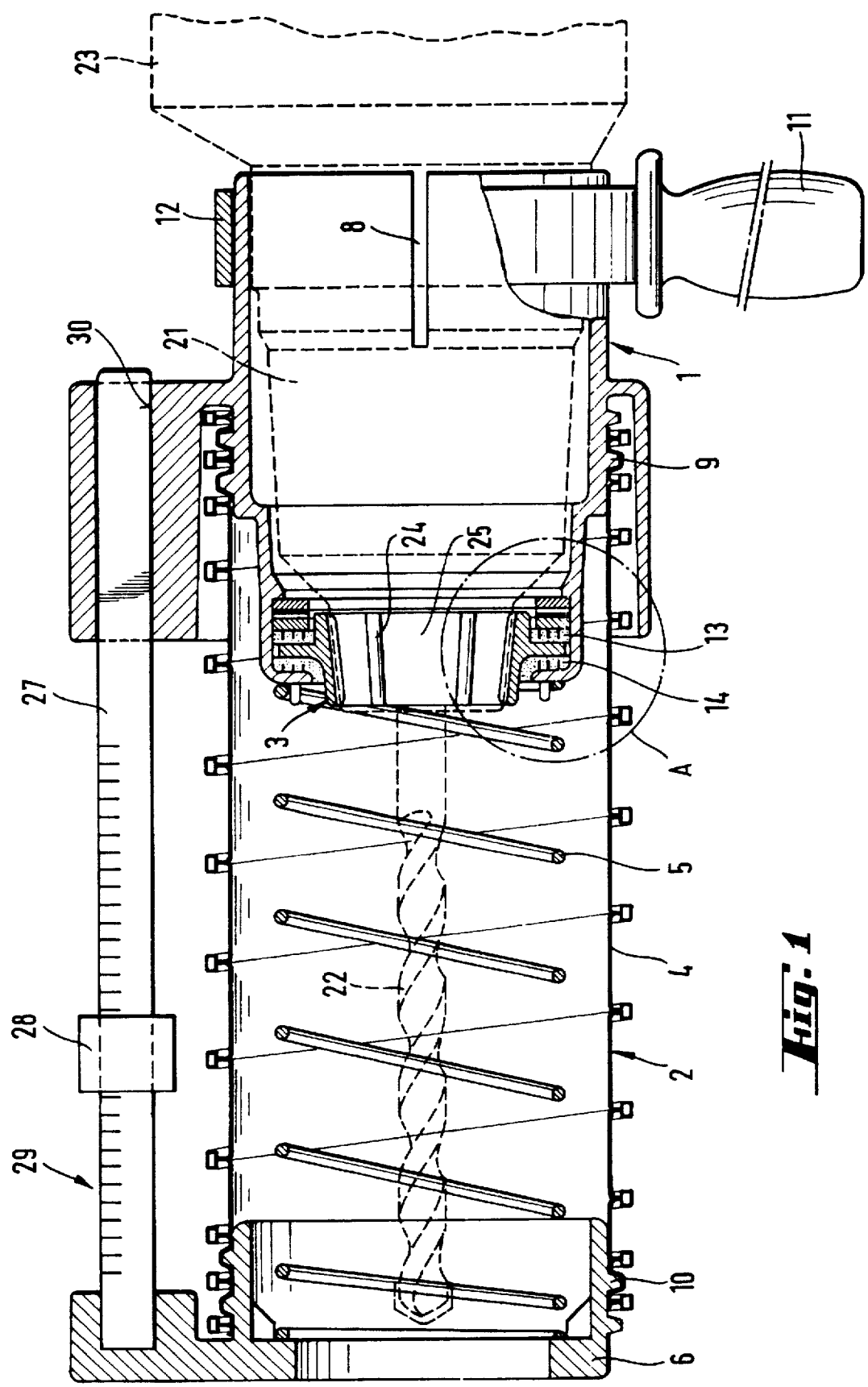
FIG. 1 is a side view of a device for collecting drilled material and dust produced by drilling tools and illustrated in section.
Figure 2:
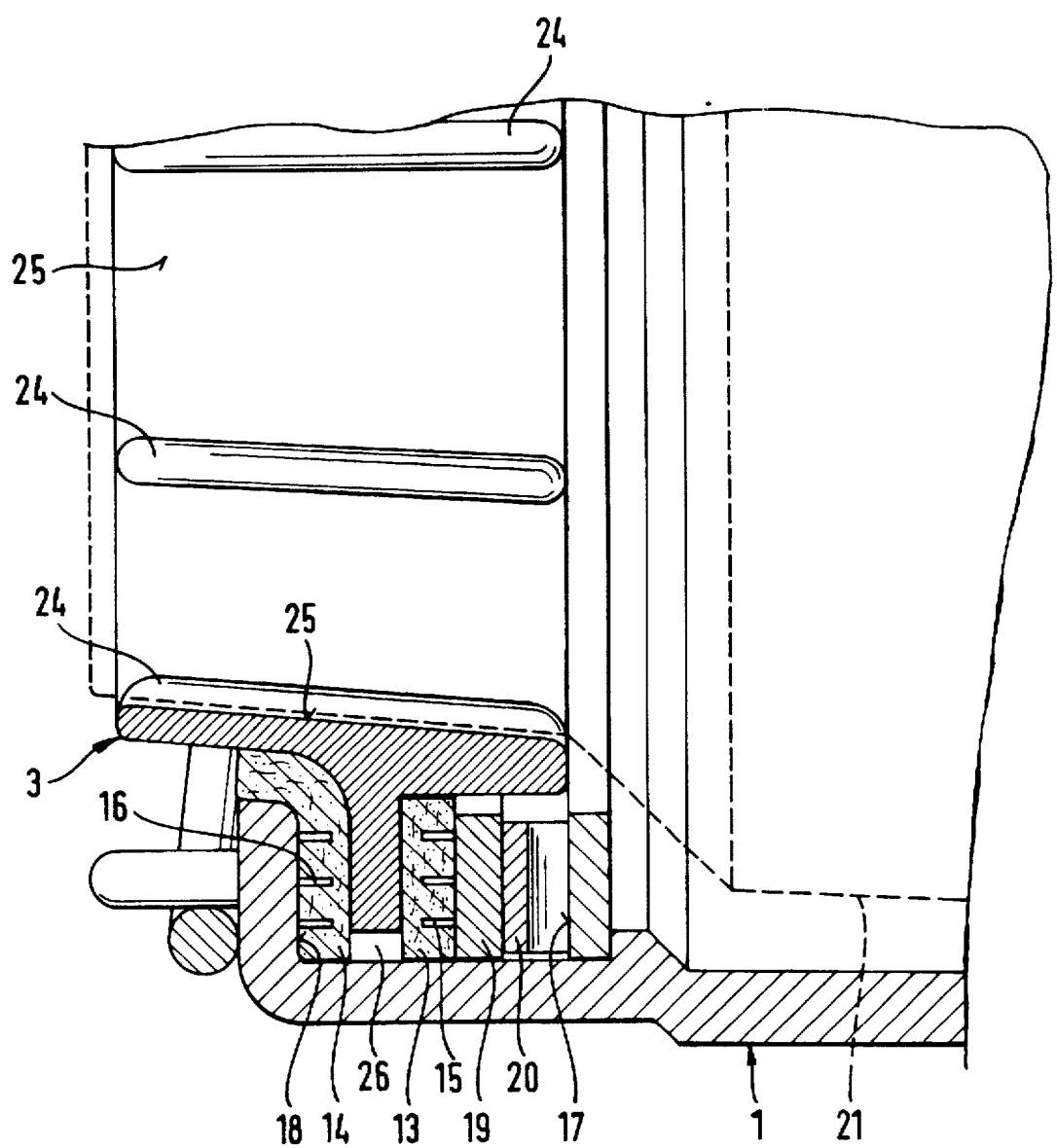
FIG. 2 is an enlarged showing of the region of the device encircled and identified by the reference character A in FIG. 1.

A device for collecting drilled material and dust produced by a drilling tool is shown in FIG. 1 and comprises an axially extending flange part 1 having a central axis and a compressible container 2 mounted on the flange part 1. In the axial direction, the flange part 1 is connected to a housing 23 of a drilling tool shown in the dashed lines. An axially extending part of the flange part 1 at its first end connected to the housing 23 has an axially extending slit 8. A clamping ring 12 connected to a side handle 11 extends around an axially extending region of the flange part 1 at its first end and the flange part 1 is deformable in the region of the slit 8 for engagement with the housing 23.

The flange part 1 laterally encircles a drill chuck 21 projecting axially outwardly from the housing 23 and a tool bit 22, also shown in dashed lines is secured in the drill chuck and extends from the chuck in the drilling direction. A ring-shaped sealing element 3 extending in the drilling direction, that is the axial direction of the drill 22, is in a positively locked connection by a profiled surface 24 of a ring shaped sealing surface 25 with a similarly profiled outside surface of the drill chuck 21.

As can be seen in FIG. 1, the sealing element 13 has an annular part encircling and in contact with the drill chuck and an annular rib projecting radially outwardly from an outside surface of the annular or ring-shaped part. The annular rib of the sealing element 3 is rotatably supported in a recess 26 formed by the flange part 1. The recess has a first inwardly extending side wall surface 18 facing counter to the drilling direction and spaced axially in the drilling direction from a second side wall surface 17 facing in the drilling direction. The second side wall surface 17 is formed by the surface of an internal retaining ring or circlip secured in the flange part 1. A first felt ring 14 is located between a surface of the annular rib of the sealing element 3 facing in the drilling direction and the first side wall surface 18. The first felt ring 14 is securely connected by means of projecting members 16 extending from the first side wall surface 18 into the body of the first felt ring 14. The projecting members 16 have a pin-like shape and extend from the first side wall surface 18 basically perpendicularly or parallel to the axial direction of the flange part 1. The length of the projecting members is less than the thickness of the first felt ring 14 extending in the drilling direction.

The radially inner annular sealing surface 25 of the sealing element 3 projects in the drilling direction outwardly from the flange part 1 and the first felt ring 14 is bent in the drilling direction forming a seal between an inner edge of the flange part 1 and the radially outer surface of the ring shaped part of the sealing element 3.

A second felt ring 14 is located on the opposite side of the annular rib of the sealing element 3 from the first felt ring 14 and is spaced from the second side wall surface 17. The second felt ring 13 is pressed by a wave-shaped or undulating washer 20 in the drilling direction against the surface of the annular rib facing opposite to the drilling direction. A thrust washer 19 is positioned between the undulating washer 20 and the rearwardly facing surface of the second felt ring 13. The thrust washer 19 has second projection members 15 formed as pin-shaped members projecting perpendicularly from a side surface of the thrust washer 19 facing in the drilling direction. The length of the pin-shaped members is less than the corresponding thickness of the second felt ring 13.

The axially compressible container 2 is formed of an axially extending bellows 4, a spring element 5 within the bellows and a support dish 6 located at the leading end of the container, that is, the end remote from the drilling tool. The flange part 1 and the support dish 6 each have a profiled region 9, 10 on an outwardly facing surface and the profiled regions form a positively locked connection with the bellows 4. The spring element 5 at its leading end in the drilling direction abuts against the support dish 6 at its inner surface and against a leading end region of the flange part 1 and presses the bellows 4 in the drilling direction. The support dish 6, as viewed in FIG. 1, projects outwardly from the leading end of the drill in the off position and has a central through opening for the drill 22.

Flange part 1 serves as a support and guide for an axially extending depth stop 29 extending in the drilling direction. The depth stop 29 includes a bar-shaped transmission element 27 extending in the drilling direction and being displaceable relative to the flange part 1 and supported in a receiving bore 30 in the flange part where the bore extends parallel to the drilling direction. The leading end of the transmission element 27 is fixed within the support dish 6. The displacement of the transmission element 27, relative to the flange part formed, can be limited by a stop element 28 axially fixable on the transmission element.

While specific embodiments of the invention have been shown and described in detail to illustrate the inventive principles, it will be understood that the invention may be embodied otherwise without departing from such principles.

What is claimed is:

1. Device for collecting drilled material and dust produced by drilling tools comprising a flange part having a central axis and arranged to be secured to a housing (23) of the drilling tool, a container for receiving the drilled material and dust having a central axis extending parallel to the central axis of said flange part and having a first end connected to said flange part (1) and a second end spaced axially outwardly from said first end and said container being compressible between the first and second ends in a direction of the central axis thereof towards said first end, an annular sealing element (3) arranged to contact a rotating part of the drilling tool, said sealing element having a ring-shaped part encircling and spaced radially outwardly from the central axis of said flange part and an annular rib projecting radially outwardly from an outside surface of said ring shaped part generally perpendicularly to the central axis of said flange part (1), said annular rib being rotatably supported in a recess in said flange part (1) spaced radially outwardly from the outside surface of said ring-shaped part and said recess being open towards the central axis of said flange part.

2. A device, as set forth in claim 1, wherein said recess has a pair of side wall surfaces (17, 18) spaced apart in and extending transversely of the drilling direction with said sealing element annular rib spaced from said side wall surfaces with a felt ring (13, 14) located on each side of said rib and in contact with opposite radially extending surfaces of said annular rib.

3. A device, as set forth in claim 2, wherein a first one of said side wall surfaces (18) cooperates with a first one of said felt rings (14) and said first one of said side wall surface (18) has elements projecting therefrom into said first felt ring (14).

4. A device, as set forth in claim 3, wherein a thrust washer (19) is located on a side of said annular rib facing opposite to the drilling direction and an undulating washer (20) is arranged between said thrust washer and a second one of said side wall surfaces (17) with said thrust washer (19) pressing a second said felt ring (13) into contact with said annular rib.

5. A device, as set forth in claim 4, wherein said thrust washer (19) has a side surface facing said annular rib with projection members extending from said thrust washer into said second felt ring (13) with said projecting members having a length from said thrust washer in the drilling direction less than the thickness of said second felt ring in the drilling direction.

6. A device, as set forth in claim 4 or 5, wherein said second side wall (17) of said recess (26) comprising an internal retaining ring or circlip secured within said flange part (1).

7. A device, as set forth in one of claims 1–5, wherein said ring-shaped part of said sealing element 3 has a ring-shaped sealing surface (25) extending generally in the drilling direction and arranged in contact with a surface of the drilling tool.

8. A device, as set forth in claim 7, wherein said sealing surface (25) of said sealing element (3) is a profiled surface (24).

9. A device, as set forth in one of claims 1–5, wherein said flange part (1) serves for supporting and guiding a depth stop (29).

10. A device, as set forth in claim 9, wherein said depth stop comprises a bar-shaped transmission element (27) extending parallel to the drilling direction and having a first end connected to said container (2) and being displaceable opposite to the drilling direction relative to said flange part (1), said depth stop includes a stop element (28) axially fixable on said transmission element (27).

* * * * *